US009584972B2

(12) United States Patent  (10) Patent No.: US 9,584,972 B2
Dong et al.  (45) Date of Patent: Feb. 28, 2017

(54) POSITIONING METHOD, CLIENT AND POSITIONING SYSTEM

(71) Applicant: Huawei Device Co., Ltd., Shenzhen (CN)

(72) Inventors: Xiandong Dong, Shenzhen (CN); Zhiming Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 453 days.

(21) Appl. No.: 14/317,287

(22) Filed: Jun. 27, 2014

(65) Prior Publication Data

US 2014/0315582 A1  Oct. 23, 2014

Related U.S. Application Data

(63) Continuation of application No. PCT/CN2012/087784, filed on Dec. 28, 2012.

(30) Foreign Application Priority Data

Dec. 28, 2011  (CN) .......................... 2011 1 0447765

(51) Int. Cl.
    *H04W 64/00*  (2009.01)
    *H04W 4/02*   (2009.01)
    *G01S 5/02*   (2010.01)

(52) U.S. Cl.
    CPC ............ *H04W 4/023* (2013.01); *G01S 5/0252* (2013.01); *H04W 64/00* (2013.01)

(58) Field of Classification Search
    None
    See application file for complete search history.

(56) References Cited

U.S. PATENT DOCUMENTS 7,664,511 B2   2/2010  Wang et al.
9,046,591 B1 * 6/2015  Yang .................... G01S 3/00
    (Continued)

FOREIGN PATENT DOCUMENTS

CN    001744763 A   3/2006
CN     1916657 A    2/2007
    (Continued)

OTHER PUBLICATIONS

Partial English Translation and Abstract of Chinese Patent Application No. CN1916657A, Aug. 25, 2014, 9 pges.
    (Continued)

*Primary Examiner* — Vladimir Magloire
*Assistant Examiner* — Frank Donado
(74) *Attorney, Agent, or Firm* — Conley Rose P.C.

(57) ABSTRACT

An indoor positioning method includes: sending, by a client, a position request instruction to at least three access points; receiving, by the client, a response message sent by each access point in response to the request instruction; sending, by the client, a corresponding measurement report message to each access point, so that each access point obtains a radio signal flight time between itself and the client; and receiving, by the client, a position estimation result from a network side, where the network side performs a comparative calculation on the radio signal flight time received from each access point and a sampling time measured in advance between each access point and each of multiple sampling points, and the position estimation result is an obtained coordinate location of a sampling point whose corresponding sampling time has a minimum time difference from the radio signal flight time received from each access point.

10 Claims, 10 Drawing Sheets

(56) References Cited

U.S. PATENT DOCUMENTS

| | | | |
|---|---|---|---|
| 2004/0157621 A1* | 8/2004 | Yamasaki | H04W 64/00 455/456.1 |
| 2006/0148491 A1* | 7/2006 | Hyun | G01S 5/0263 455/456.1 |
| 2008/0146262 A1 | 6/2008 | Schwoerer et al. | |
| 2009/0092111 A1 | 4/2009 | Horn et al. | |
| 2010/0150117 A1 | 6/2010 | Aweya et al. | |
| 2011/0092223 A1* | 4/2011 | Nakagawa | G01S 5/06 455/456.1 |
| 2012/0149390 A1* | 6/2012 | Gravely | G01S 5/14 455/456.1 |
| 2012/0157128 A1 | 6/2012 | Aust et al. | |
| 2013/0021912 A1* | 1/2013 | Finlow-Bates | G01S 5/021 370/241 |

FOREIGN PATENT DOCUMENTS

| | | |
|---|---|---|
| CN | 101198163 A | 6/2008 |
| CN | 101825696 A | 9/2010 |
| CN | 101883424 A | 11/2010 |
| WO | 2009084859 A2 | 7/2009 |
| WO | 2010118104 A1 | 10/2010 |
| WO | 2011024436 A1 | 3/2011 |
| WO | 2011097414 A1 | 8/2011 |

OTHER PUBLICATIONS

Foreign Communication From a Counterpart Application, PCT Application No. PCT/CN2012/087784, English Translation of International Search Report dated Apr. 18, 2013, 2 pages.

Foreign Communication From a Counterpart Application, PCT Application No. PCT/CN2012/087784, English Translation of Written Opinion dated Apr. 18, 2013, 11 pages.

Partial English Translation and Abstract of Chinese Patent Application No. CN101825696A, May 12, 2015, 24 pages.

Partial English Translation and Abstract of Chinese Patent Application No. CN101883424A, May 12, 2015, 5 pages.

Foreign Communication From a Counterpart Application, Chinese Application No. 201110447765.6, Chinese Office Action dated Mar. 31, 2015, 8 pages.

Foreign Communication From a Counterpart Application, Chinese Application No. 201110447765.6, Chinese Notice of Allowance dated Apr. 12, 2016, 4 pages.

* cited by examiner

POSITIONING METHOD, CLIENT AND POSITIONING SYSTEM

CROSS-REFERENCE TO RELATED APPLICATIONS

This application is a continuation of International Application No. PCT/CN2012/087784, filed on Dec. 28, 2012, which claims priority to Chinese Patent Application No. 201110447765.6, filed on Dec. 28, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a positioning method, client and positioning system.

BACKGROUND

Wireless-Fidelity (Wi-Fi) is a technology that can connect clients such as a personal computer and a hand-held device wirelessly, where the clients can communicate with each other by using an access point, and meanwhile, the access point can provide management and a service for the clients. As a coverage range of the Wi-Fi access point is increasingly wide, there are more and more indoor positioning systems implementing indoor positioning by using Wi-Fi. For example, when people in an unfamiliar shopping mall want to know in which positions of the shopping mall they are located, or need to determine their positions when searching for a certain destination by means of indoor navigation, they can determine their positions by using their Wi-Fi-enabled mobile phones.

However, when users want to determine their positions, unstable signal intensity and a measurement error produced by multipath and wall penetration during communication leads to inaccurate positioning and inconvenience of use of a positioning function, which prevents the users from learning their positions accurately.

SUMMARY

Embodiments of the present invention provide a positioning method, a client and a positioning system, which can implement accurate positioning, enabling a client to learn its position accurately and further enhancing user convenience.

To achieve the forgoing objective, the embodiments of the present invention adopt the following technical solutions:

According to an aspect, an embodiment of the present invention provides a positioning method, including: sending, by a client, a position request instruction to at least three access points; receiving, by the client, a response message to the request instruction, from each access point; sending, by the client, a corresponding measurement report message to each access point, so that each access point obtains a radio signal flight time between itself and the client; and receiving, by the client, a position estimation result from a network side, where the network side performs a comparative calculation on the radio signal flight time received from each access point and a sampling time measured in advance between each access point and each of multiple sampling points, and the position estimation result is an obtained coordinate location of a sampling point whose corresponding sampling time has a minimum time difference from the radio signal flight time received from each access point; and the sampling time for each of the multiple sampling points includes a radio signal flight time between each of the multiple sampling points and each access point.

According to another aspect, an embodiment of the present invention provides a positioning method, including: sending, by a client, a position request instruction to at least three access points, so that each access point sends a first measurement message to the client; receiving, by the client, the first measurement message from each of the at least three access points; sending, by the client, a response message to the first measurement message, to each access point, and receiving a second measurement message from each access point, so as to obtain a radio signal flight time between each access point and the client; and performing, by the client, a comparative calculation on the radio signal flight time between each access point and the client and a radio signal flight time measured in advance between each of multiple sampling points and each access point, and using a coordinate location of a sampling point with a minimum time difference as positioning coordinates of the client.

According to an aspect, an embodiment of the present invention provides a client, including: a first sending unit configured to send a position request instruction to at least three access points; a first receiving unit configured to receive, from each access point, a response message to the request instruction; a second sending unit configured to send a corresponding measurement report message to each access point, so that each access point obtains a radio signal flight time between itself and the client; and a second receiving unit configured to receive a position estimation result from a network side, where the network side performs a comparative calculation on the radio signal flight time received from each access point and a sampling time measured in advance between each access point and each of multiple sampling points, and the position estimation result is an obtained coordinate location of a sampling point whose corresponding sampling time has a minimum time difference from the radio signal flight time received from each access point; and the sampling time for each of the multiple sampling points includes a radio signal flight time between each of the multiple sampling points and each access point.

According to another aspect, an embodiment of the present invention provides a client, including: a storing unit configured to store a radio signal flight time measured in advance between each of several sampling points and each access point; a first sending unit configured to send a position request instruction to at least three access points, so that each access point sends a first measurement message to the client; a first receiving unit configured to receive the first measurement message from each of the at least three access points; a second sending unit configured to send, to each access point, a response message to the first measurement message; a second receiving unit configured to receive a second measurement message from each access point, so as to obtain a radio signal flight time between each access point and the client; and a processing unit configured to obtain a position estimation result, where the client performs a comparative calculation on the radio signal flight time between each access point and the client and a radio signal flight time measured in advance between each of the multiple sampling points and each access point, and uses a coordinate location of a sampling point with a minimum time difference as positioning coordinates of the client.

According to an aspect, an embodiment of the present invention provides a positioning system, including: a client configured to: after sending a position request instruction to at least three access points, receive a response message sent by each access point in response to the request instruction, send a corresponding measurement report message to each access point so that each access point obtains a radio signal flight time between itself and the client, and receive a position estimation result from a network side; the at least three access points configured to: after receiving the position request instruction from the client, send the response message to the client, and receive the corresponding measurement report message from the client, so as to respectively obtain the radio signal flight time between each access point and the client, and send the obtained respective radio signal flight time between each access point and the client to the network side; and the network side configured to perform a comparative calculation on the radio signal flight time received from each access point and a sampling time measured in advance between each access point and each of multiple sampling points, obtain a coordinate location of a sampling point whose corresponding sampling time has a minimum time difference from the radio signal flight time received from each access point, and send the coordinate location to the client, where the sampling time for each of the multiple sampling points includes a radio signal flight time between each of the multiple sampling points and each access point.

According to another aspect, an embodiment of the present invention provides a positioning system, including: a client configured to send a position request instruction to at least three access points, receive a first measurement message from each of the at least three access points, send to each access point a response message to the first measurement message, receive a second measurement message from each access point so as to obtain a radio signal flight time between each access point and the client, perform a comparative calculation on the radio signal flight time between each access point and the client and a radio signal flight time measured in advance between each of multiple sampling points and each access point, and use a coordinate position of a sampling point corresponding to a sampling time with a minimum time difference as positioning coordinates of the client; and the at least three access points configured to receive the position request instruction from the client, send the first measurement message to the client, receive from the client the response message to the first measurement message, and send the second measurement message to the client, so that the client obtains the radio signal flight time between each access point and the client.

According to the positioning methods, clients and positioning systems provided in the embodiments of the present invention, a client sends a position request instruction to at least three access points, and each access point sends to the client a response message to the request instruction, and receives a corresponding measurement report message from the client, so as to obtain a radio signal flight time between the access point and the client, and then send the radio signal flight time to a network side; then, the network side can perform a comparative calculation on the received radio signal flight times and a sampling time measured in advance between each access point and each of multiple sampling points, obtain a coordinate location of a sampling point whose corresponding sampling time has a minimum time difference from the radio signal flight time received from each access point, and inform the client about the coordinate location, where the coordinate location is a position of the client. The solutions can implement accurate positioning, enabling the client to learn its position accurately and further enhancing user convenience.

BRIEF DESCRIPTION OF THE DRAWINGS

To illustrate the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
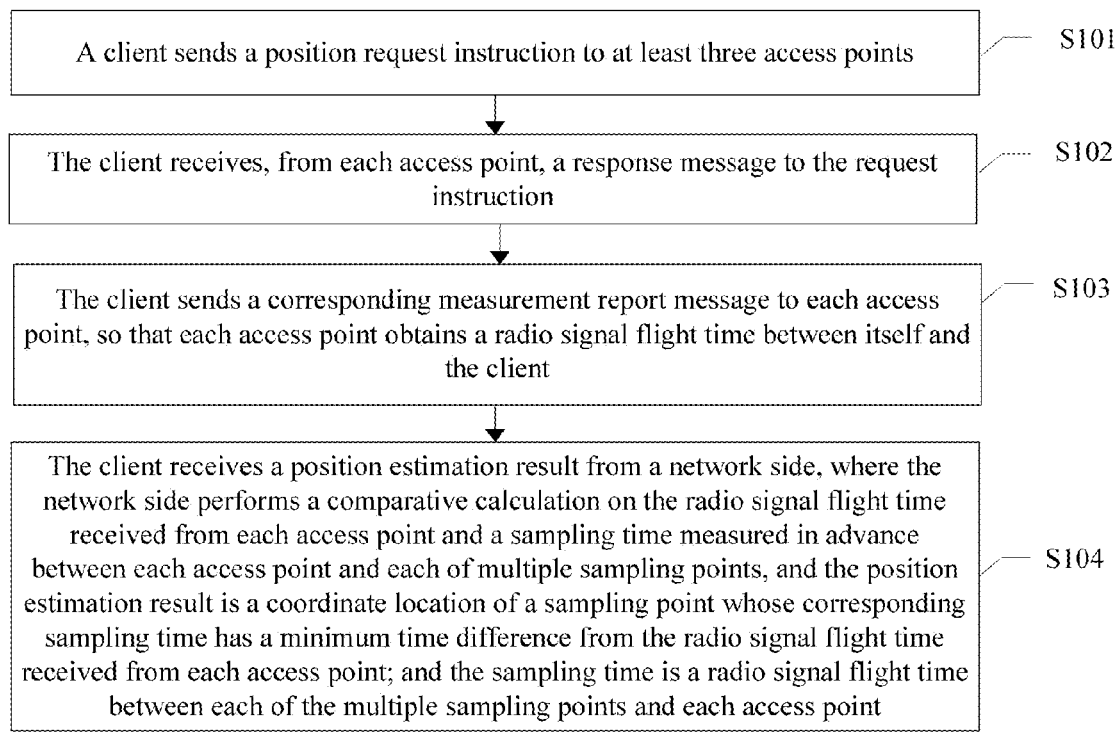
FIG. 1 is a flowchart of a positioning method according to Embodiment 1 of the present invention.

As shown in FIG. 1, the embodiment of the present invention provides a positioning method, where the method includes:

S101: A client sends a position request instruction to at least three access points.

In this embodiment, a main function of an access point is to connect wireless network clients together and then connect a wireless network to an Ethernet. The access point is equivalent to a bridge that connects a wired network and a wireless network. The access point in this embodiment may be specifically a wireless switch.

At least three access points are deployed in an indoor spatial area. To implement positioning on a plane, at least three access points need to be deployed, and it is required that the three access points should not be collinear. Because what each access point finally obtains is a radio signal flight time between the access point and the client, and a radio signal transmission speed is definite and known, the access point can actually obtain a distance between the client and the access point. When a first access point obtains a distance between the first access point and the client, what can be determined is a circle with the first access point being a centre and the distance between the first access point and the client being a radius. When a second access point obtains a distance between the second access point and the client, what can be determined is a circle with the second access point being a centre and the distance between the second access point and the client being a radius. In this case, the two circles are intersected, and two intersection points rather than one point can be determined. However, after a third access point obtains a distance between the third access point and the client and a circle with the third access point being a centre and the distance between the third access point and the client being a radius is determined, because the three access points are not collinear, one intersection point can be determined, and the intersection point is a position of the client. If it is necessary to perform positioning in a three-dimensional space, for example, if many access points are deployed inside a building and a radio signal frequency spectrum with high penetrability is used for communication, the client and upstairs and downstairs access points can measure the flight times simultaneously. Moreover, to determine, according to a positioning result, a position of the client on a floor and the floor on which the client is located, it is necessary to measure the flight times between the client and at least four access points, where the four access points are not coplanar and any three of them are not collinear. Similarly, a more accurate positioning result can be obtained if a measurement is performed between the client and more access points.

Therefore, when the client enters the area and needs to learn its position, the client needs to send a position request instruction to at least three access points, where the position request instruction is used to enable the access points to measure a message flight time.

S102: The client receives, from each access point, a response message to the request instruction.

After sending the position request instruction to the at least three access points, the client receives, from each access point, the response message to the request instruction.

S103: The client sends a corresponding measurement report message to each access point, so that each access point obtains a radio signal flight time between itself and the client.

After receiving the position request instruction from the client, each access point measures a radio signal flight time the message flight time. Each access point sends a response message to the client, records the message sending time, receives a corresponding measurement report message from the client, records the message arrival time, and calculates a radio signal flight time between itself and the client according to the response message arrival time and the measurement report message sending time that are recorded by the client. It should be noted that the response message may be an acknowledgement control frame for the position request instruction.

S104: The client receives a position estimation result from a network side, where the network side performs a comparative calculation on the radio signal flight time received from each access point and a sampling time measured in advance between each access point and each of multiple sampling points, and the position estimation result is an obtained coordinate location of a sampling point whose corresponding sampling time has a minimum time difference from the radio signal flight time received from each access point; and the sampling time for each of the multiple sampling points includes a radio signal flight time between each of the sampling points and each access point.

The network side has a storage function for storing required data and is connected to each access point in a wired manner.

The network side receives the radio signal flight time from each access point, and performs a comparative calculation on the radio signal flight time received from each access point and a radio signal flight time measured in advance between each of several sampling points and each access point, where the radio signal flight time measured in advance between each of the several sampling points and each access point are obtained by deploying several sampling points and at least three access points in an indoor spatial area of a positioning service area, storing coordinate values of each sampling point and each access point on the network side, and then sequentially placing a sampling terminal at the several sampling points, where the sampling terminal receives a response message from each access point, and sends a corresponding measurement report message to each access point, so that each access point obtains a radio signal flight time between itself and each sampling terminal; and the radio signal flight time between each access point and each sampling terminal is stored on the network side.

According to the positioning method provided in this embodiment of the present invention, a client sends a position request instruction to at least three access points, and each access point sends to the client a response message to the request instruction, and receives a corresponding measurement report message from the client, so as to obtain a radio signal flight time between each access point and the client, and then send the radio signal flight time to a network side; then, the network side can perform a comparative calculation on the received radio signal flight times and a sampling time measured in advance between each access point and each of multiple sampling points, obtain a coordinate location of a sampling point whose corresponding sampling time has a minimum time difference from the radio signal flight time received from each access point, and inform the client about the coordinate location, where the coordinate location is a position of the client. By using this solution, accurate positioning can be implemented, enabling the client to learn its position accurately and further enhancing user convenience.

Embodiment 2

Figure 2:
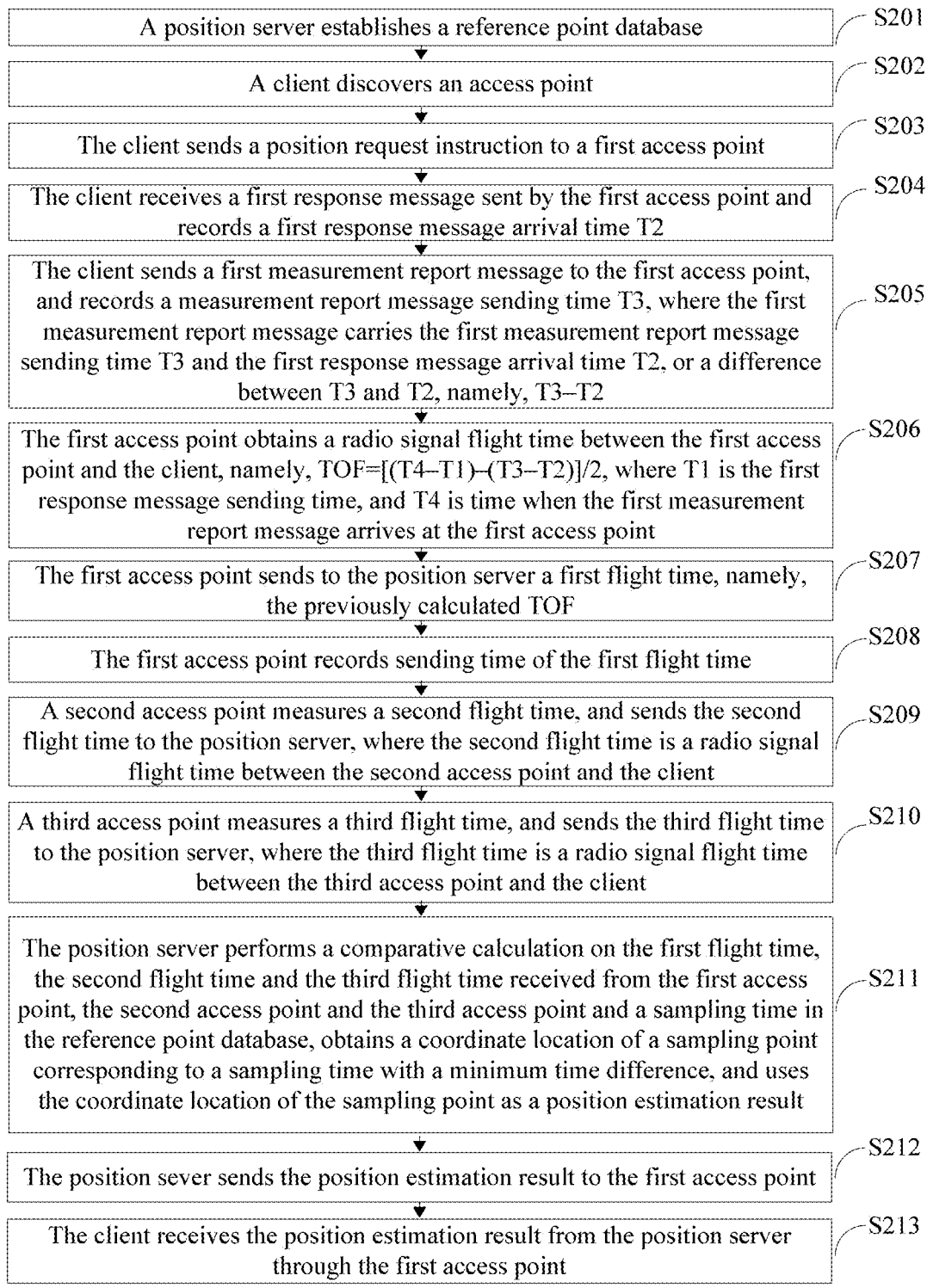
FIG. 2 is a flowchart of a positioning method according to Embodiment 2 of the present invention.

The embodiment of the present invention provides a positioning method. As shown in FIG. 2, assuming that this embodiment includes a client, a first access point, a second access point, a third access point, and a network side that is specifically a position server, and that the first access point is associated with the position server, the method includes the following steps:

S201: The position server establishes a reference point database.

After multiple sampling points and at least three access points are deployed in an area in which a positioning service is provided and each access point obtains a radio signal flight time between the access point and the client, the reference point database is established by the position server by storing coordinate values of each sampling point and each access point as well as the radio signal flight time between each access point and the client.

Figure 3:
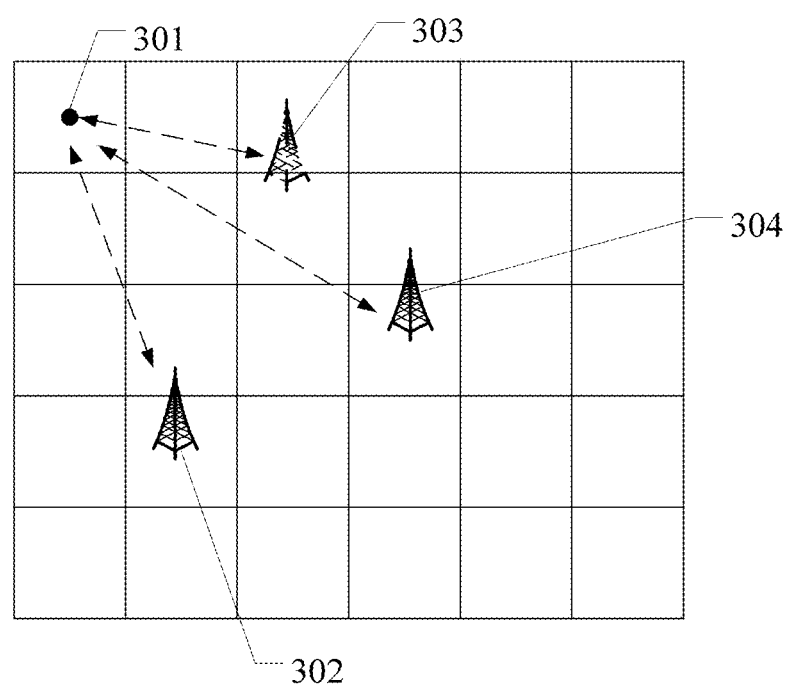
FIG. 3 is an schematic diagram of an application scenario for the positioning method according to Embodiment 2 of the present invention.

In order to describe more clearly how the reference point database is established, the following uses FIG. 3 as an example for further description, where positioning is performed in a two-dimensional plane exemplarily by using a method of deploying three access points and dividing an area that can be simultaneously covered by the three access points into 1×1 m grids: an indoor spatial area is divided into 1×1 m grids, and the centre of each grid is used as a sampling point, where each sampling point has corresponding coordinate values; several access points are deployed. Because there is no direction information, at least three access points need to be deployed, where each access point also has corresponding coordinate values; a sampling terminal is placed at a first sampling point 301, where the sampling terminal receives a response message from a first access point 302, and sends a corresponding measurement report message to the first access point 302, so that the first access point 302 obtains a radio signal flight time between the first access point 302 and the first sampling point 301, and similarly, a second access point 303 obtains a radio signal flight time between the first sampling point 301 and the second access point 303, and a third access point 304 obtains a radio signal flight time between the first sampling point 301 and the third access point 304; a sampling terminal is placed at each sampling point by using a similar method, to obtain a radio signal flight time between each access point and each sampling terminal, namely, a sampling time; and then, the position server stores the coordinate values of each sampling point, the coordinate values of each access point, and the radio signal flight time between each access point and each sampling terminal, so as to establish the reference point database.

Further, if it is necessary to perform positioning in a three-dimensional space, for example, if many access points are deployed inside a building and a radio signal frequency spectrum with high penetrability is used for communication, the flight times between the client and upstairs and downstairs access points can be measured simultaneously. Moreover, to determine, according to a positioning result, a position of the client on a floor and the floor on which the client is located, it is necessary to measure the flight times between the client and at least four access points, where the four access points are not coplanar and any three of them are not collinear. Similarly, a more accurate positioning result can be obtained if a measurement is performed between the client and more access points.

It should be noted that in an actual application scenario, another method may also be adopted to divide a positioning service area to deploy sampling points or access points. However, regardless of which positioning service area division method is in use, the foregoing positioning method is always adopted to enable a position server to store coordinate values of each sampling point, coordinate values of each access point, and a radio signal flight time between each sampling point and each sampling terminal, and to finally establish a reference point database. Therefore, the method is not described here again, but shall fall within the protection scope of the present invention.

S202: The client discovers an access point.

The client may discover an access point by listening on a beacon frame or in a proactive detection manner. The access point may inform the client, by using the beacon frame or a detection response frame, that the access point supports positioning of the client, where the beacon frame or the detection response frame may carry an identifier (ID) of each of other access points and channel information of each access point. In this way, after receiving the beacon frame or the detection response frame, the client can learn more quickly other nearby access points that support positioning of the client, thereby increasing an access point discovery speed of the client.

S203: The client sends a position request instruction to the first access point.

The client sends the position request instruction to the first access point after learning that the first access point supports positioning of the client.

S204: The client receives a first response message sent by the first access point and records a first response message arrival time T2.

It should be noted that the first response message may be an acknowledgement control frame for the position request instruction. In addition, a command identifier that may be carried in the position request instruction in step S203 is used to enable the first access point to identify that the first response message is an acknowledgement control frame for the position request instruction.

It should be noted that in the steps of the method according to this embodiment of the present invention, time measured by each access point and the client can be accurate to nanoseconds, and a message arrival time and a message sending time can be calculated accurately. It should be noted that, messages are all coded and modulated at a physical layer, and are encapsulated into medium access control (MAC) frames at a MAC layer, and these processings require a processing time that is stable and accurate to nanoseconds; and each access point and the client can record a message processing time, so that a message sending or arrival time that meets a positioning requirement is obtained when necessary, and the messages carry the message sending and/or arrival time that meets the positioning requirement, or the messages carry a time difference between the message sending time and arrival time that meet the positioning requirement.

S205: The client sends a first measurement report message to the first access point, and records a measurement report message sending time T3, where the first measurement report message carries the first measurement report message sending time T3 and the first response message arrival time T2, or a difference between T3 and T2, namely, T3−T2.

S206: The first access point obtains a radio signal flight time between the first access point and the client, namely, $TOF=[(T4-T1)-(T3-T2)]/2$, where T1 is sending time of the first response message, and T4 is time when the first measurement report message arrives at the first access point.

It should be noted that, after receiving the position request instruction from the client, the first access point may further send to the client an acknowledgement message (e.g., an ACK message defined in related Institute of Electrical and Electronics Engineers (IEEE) 802.11 standards) as the first response message, and record T1, which is the sending time of the acknowledgement message. The ACK message must be sent, and therefore, recording time of the ACK message that must be sent eliminates the need to send another constructed or defined message, and further reduces the number of air interface messages and shortens the time needed for a position measurement. Similarly, after receiving a message from a peer party, each access point and the client may return an acknowledgement message to inform the peer party about reception of the message. Certainly, a measurement response management message may also be defined here as the first response message.

Because the first measurement report message in step S206 carries a difference between the first measurement report message sending time T3 and the first response message arrival time T2, namely, T3−T2, the first access point and the client are not required to be synchronous in time, but are only required to record the message sending time and arrival time and accurately perform timing to an accuracy of nanoseconds.

Certainly, there is another implementation manner for the measurement and calculation method of the radio signal flight time. For example, in a case that the first access point and the client are strictly synchronous in time, a difference between the first response message arrival time T2 and the sending time T1 is calculated. That is, when the first access point sends the first response message to the client, the first response message carries the message sending time T1, and then the radio signal flight time between the first access point and the client, namely, TOF=T2−T1, may also be calculated; or, when the client sends the position request instruction to the first access point, the client records the position request instruction sending time T1 and includes the sending time T1 into the position request instruction, and then the radio signal flight time between the first access point and the client, namely, TOF=T2−T1, may be calculated after the first access point receives the position request instruction and records the arrival time T2.

S207: The first access point sends to the position server a first flight time, namely, the previously calculated TOF.

When sending the first flight time to the position server, the first access point may further send a client ID and a command ID.

S208: The first access point records a first flight time sending time.

The first flight time sending time is an access point timestamp, and is used to inform the position server about the time when the first access point performs measurement of the first access point. Therefore, in step S207, when sending the first flight time to the position server, the first access point may further send the access point timestamp.

S209: The second access point measures a second flight time, and sends the second flight time to the position server, where the second flight time is a radio signal flight time between the second access point and the client.

S210: The third access point measures a third flight time, and sends the third flight time to the position server, where the third flight time is a radio signal flight time between the third access point and the client.

It should be noted that, in steps S209 to S210, the methods used by the second access point and the third access point to measure the second flight time and the third flight time are the same as the method used by the first access point to measure the first flight time, which is described in steps S202 to S208, and is not described here again.

S211: The position server performs a comparative calculation on the first flight time, the second flight time and the third flight time received from the first access point, the second access point and the third access point and a sampling time in the reference point database, obtains a coordinate location of a sampling point corresponding to a sampling time with a minimum time difference, and uses the coordinate location of the sampling point as a position estimation result.

As data recorded in the reference point database includes the radio signal flight time between each sampling point and each access point, the position server may perform a mean square error operation on the flight times received from the first access point, the second access point and the third access point and the radio signal flight time between each sampling point and each access point in the reference point database, so as to find out a sampling point with a minimum time variance, where the coordinate location of the sampling point is a position of the client, and the position server uses the coordinate location of the sampling point as the position estimation result. It should be noted that, the position server may also adopt other calculation methods to find an accurate reference point in the database according to measured data, and further estimate the position of the client according to coordinates of the reference point and the measured data, and the other methods are not described here again.

S212: The position server sends the position estimation result to the first access point.

S213: The client receives, through the first access point, the position estimation result sent by the position server.

Specifically, the client may also obtain its positioning result by using another network, for example, a cellular network. Certainly, as the positioning is implemented by using a Wi-Fi network, it is naturally comparatively reasonable that the client obtains the positioning result by using a Wi-Fi network.

It should be noted that, if the positioning is implemented on a plane, the client can obtain a positioning result by measuring the flight time with three access points, but it is required that the three access points are not collinear. A more accurate positioning result can be obtained if the client measures the flight time with more access points. If it is necessary to perform positioning in a three-dimensional space, for example, if many access points are deployed inside a building and a radio signal frequency spectrum with high penetrability is used for communication, the client and upstairs and downstairs access points can measure the flight times simultaneously. Moreover, to determine, according to a positioning result, a position of the client on a floor and the floor on which the client is located, it is necessary to measure the flight times between the client and at least four access points, where the four access points are not coplanar and any three of them are not collinear. Similarly, a more accurate positioning result can be obtained if a measurement is performed between the client and more access points.

According to the positioning method provided in this embodiment of the present invention, after learning that an access point supports positioning of a client, the client sends a position request instruction to at least three access points, and each access point sends to the client a response message to the request instruction, and receives a corresponding measurement report message from the client, so as to obtain a radio signal flight time between each access point and the client, and then send the radio signal flight times to a network side; then, the network side can perform a comparative calculation on the received radio signal flight times and a sampling time measured in advance between each access point and each of multiple sampling points, to obtain a coordinate location of a sampling point whose corresponding sampling time has a minimum time difference from the radio signal flight time received from each access point, and inform the client about the coordinate location, where the coordinate location is a position of the client. By using this solution, accurate positioning can be implemented, enabling the client to learn its position accurately and further enhancing user convenience.

Embodiment 3

Figure 4:
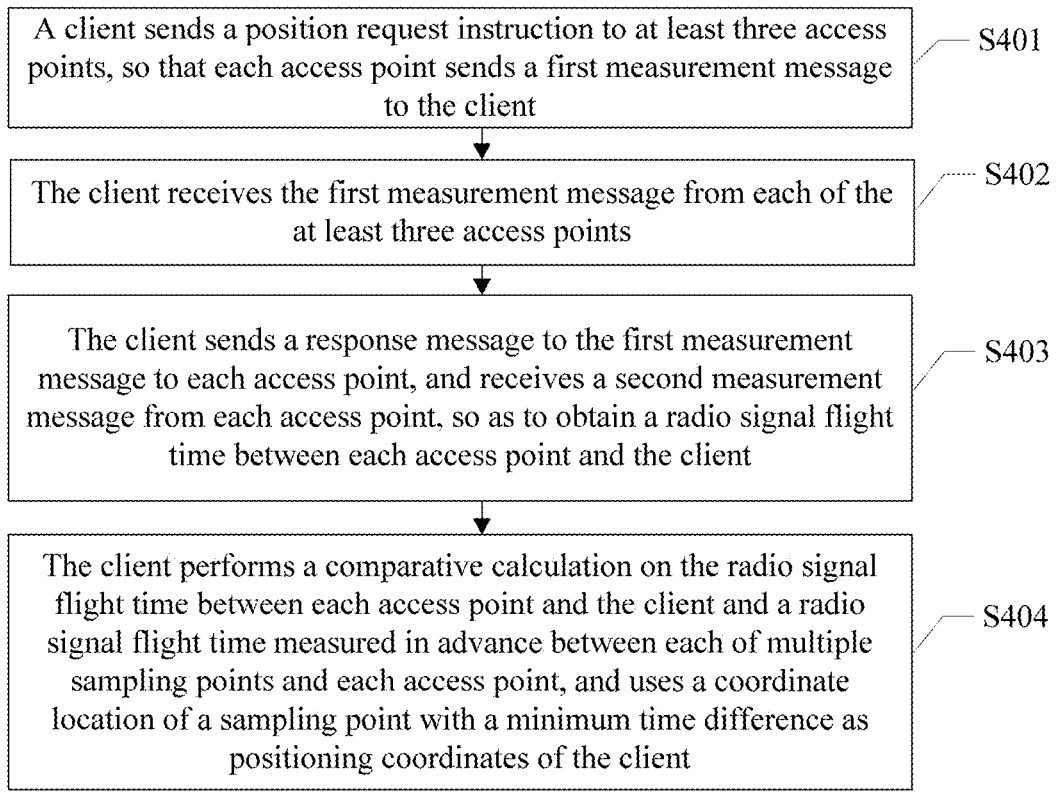
FIG. 4 is a flowchart of a positioning method according to Embodiment 3 of the present invention.

The embodiment of the present invention provides a positioning method. As shown in FIG. 4, the method includes:

S401: A client sends a position request instruction to at least three access points, so that each access point sends a first measurement message to the client.

S402: The client receives the first measurement message from each of the at least three access points.

S403: The client sends to each access point a response message to the first measurement message, and receives a second measurement message from each access point, so as to obtain a radio signal flight time between each access point and the client.

S404: The client performs a comparative calculation on the radio signal flight time between each access point and the client and a radio signal flight time measured in advance between each of multiple sampling points and each access point, and uses a coordinate location of a sampling point with a minimum time difference as positioning coordinates of the client.

It should be noted that the response message may be an acknowledgement control frame of the first measurement message. In addition, the radio signal flight time measured in advance between each of the multiple sampling points and each access point may be preset in a user terminal by a user, or may be stored on a network side, and the user terminal only needs to download from the network side to obtain the radio signal flight time measured in advance between each of the multiple sampling points and each access point.

According to the positioning method provided in this embodiment of the present invention, a client sends a position request instruction to at least three access points, and after receiving a first measurement message from each access point, sends to each access point a response message to the first measurement message, and receives a second measurement message from each access point, so as to obtain a radio signal flight time between each access point and the client; and then, the client performs a comparative calculation on the obtained radio signal flight times and a radio signal flight time measured in advance between each of several sampling points and each access point, and uses a coordinate location of a sampling point with a minimum time difference as positioning coordinates of the client. By using this solution, accurate positioning can be implemented, enabling the client to learn its position accurately and further enhancing user convenience.

Embodiment 4

Figure 5:
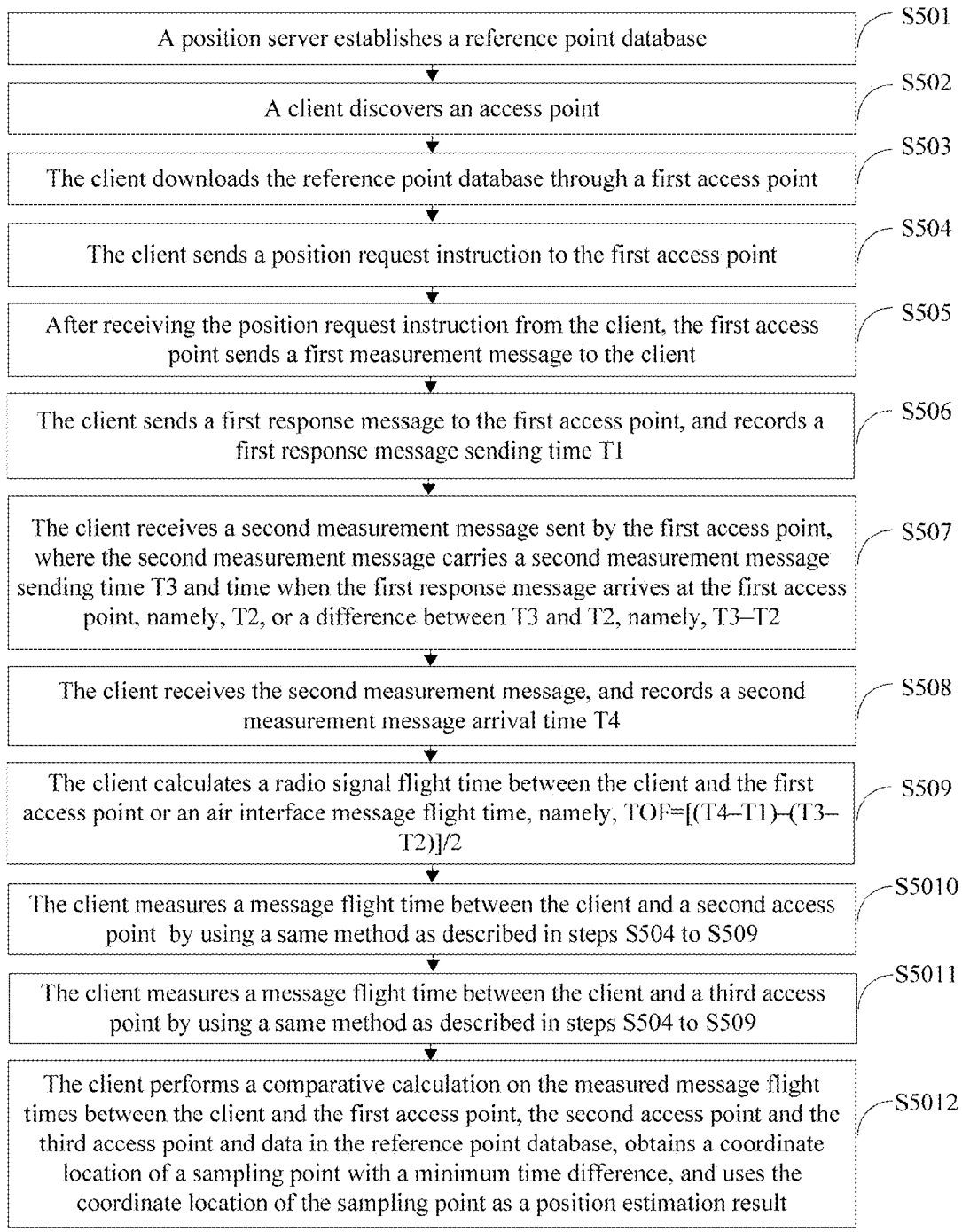
FIG. 5 is a flowchart of a positioning method according to Embodiment 4 of the present invention.

The embodiment of the present invention provides a positioning method. As shown in FIG. 5, assuming that this embodiment includes a client, a first access point, a second access point, a third access point and a position server, and that the first access point is associated with the position server, the method includes the following steps:

S501: The position server establishes a reference point database.

The establishment of the reference point database is the same as described in step S201, and is not described here again.

S502: The client discovers an access point.

The client may discover an access point by listening on a beacon frame or in a proactive detection manner. The access point may inform the client, by using the beacon frame or a detection response frame, that the access point supports positioning of the client, where the beacon frame or the detection response frame may carry an ID of each of other access points and channel information of each access point. In this way, after receiving the beacon frame or the detection response frame, the client can learn more quickly other nearby access points that support positioning of the client, thereby increasing an access point discovery speed of the client.

S503: The client downloads the reference point database through the first access point.

The client may download the reference point database by communicating with the position server over Internet Protocol (IP) or by other means, for example, downloading the reference point database directly at an MAC layer of an air interface. Similarly, the client may also obtain the required reference point database by other communication means, for example, through a cellular network or a wired local area network, or even through pre-configuration or the like. A specific manner for obtaining the reference point database is not limited in the present invention. However, as the positioning is implemented by using a Wi-Fi network, it is comparatively reasonable to obtain the database by using a Wi-Fi network.

S504: The client sends a position request instruction to the first access point.

S505: After receiving the position request instruction from the client, the first access point sends a first measurement message to the client.

S506: The client sends a first response message to the first access point, and records a first response message sending time T1.

The first response message may be an acknowledgement message, namely, an ACK message, indicating reception of the first measurement message; and the client records the acknowledgement message sending time T1. It should be noted that the first response message may be an acknowledgement control frame of the first measurement message.

S507: The client receives the second measurement message sent by the first access point, where the second measurement message carries a second measurement message sending time T3 and time when the first response message arrives at the first access point, namely, T2, or a difference between T3 and T2, namely, T3−T2.

S508: The client receives the second measurement message, and records a second measurement message arrival time T4.

S509: The client calculates a radio signal flight time or an air interface message flight time between the client and the first access point, namely, TOF=[(T4−T1)−(T3−T2)]/2.

S5010: The client measures a message flight time between the client and the second access point by using a same method as described in steps S504 to S509.

S5011: The client measures a message flight time between the client and the third access point by using a method the same as the method described in steps S504 to S509.

S5012: The client performs a comparative calculation on the measured message flight times between the client and the first access point, the second access point and the third access point and data in the reference point database, obtains a coordinate location of a sampling point with a minimum time difference, and uses the coordinate location of the sampling point as a position estimation result.

Based on the obtained data, the client may adopt another calculation method to obtain a position estimation result that is more close to the truth, and may perform measurement with more access points so as to improve accuracy of the position estimation result and implement three-dimensional positioning, and the another method is not described here.

According to the indoor positioning method provided in this embodiment of the present invention, a client discovers an access point that supports positioning of the client, obtains a radio signal flight time measured in advance between each of several sampling points and each access point, sends a position request instruction to at least three access points, and after receiving a first measurement message from each access point, sends to each access point a response message to the first measurement message, and receives a second measurement message from each access point, so as to obtain a radio signal flight time between each access point and the client; and then, the client performs a comparative calculation on the obtained radio signal flight times and the radio signal flight time measured in advance between each of the several sampling points and each access point, and obtains a coordinate location of a sampling point with a minimum time difference, where the coordinate location is a position of the client. By using this solution, accurate positioning can be implemented, enabling the client to learn its position accurately and further enhancing user convenience.

Embodiment 5

Figure 6:
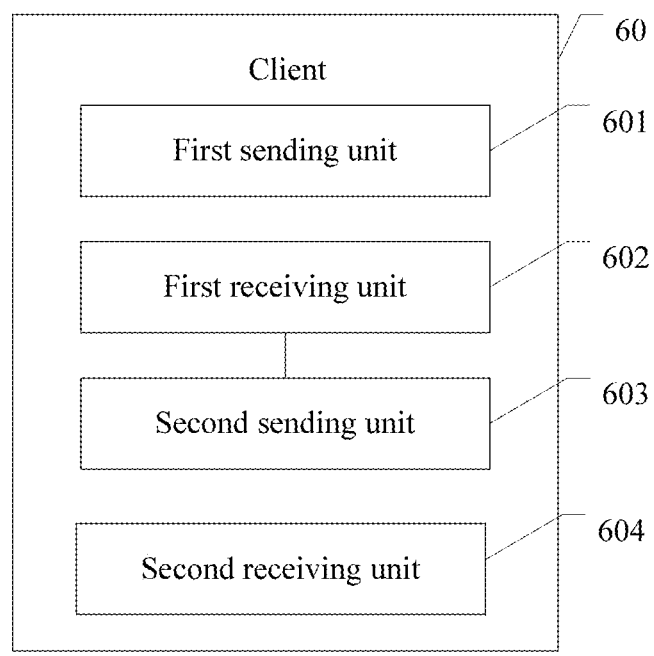
FIG. 6 is a first schematic structural diagram of a client according to Embodiment 5 of the present invention.

The embodiment of the present invention provides a client 60, which can be applied to the method provided by Embodiment 1. As shown in FIG. 6, the client includes: a first sending unit 601 configured to send a position request instruction to at least three access points; a first receiving unit 602 configured to receive, from each access point, a response message to the request instruction; a second sending unit 603 configured to send a corresponding measurement report message to each access point, so that each access point obtains a radio signal flight time between itself and the client; and a second receiving unit 604 configured to receive a position estimation result from a network side, where the network side performs a comparative calculation on the radio signal flight time received from each access point and a sampling time measured in advance between each access point and each of multiple sampling points, and the position estimation result is an obtained coordinate location of a sampling point whose corresponding sampling time has a minimum time difference from the radio signal flight time received from each access point; and the sampling time for each of the multiple sampling points includes a radio signal flight time between each of the multiple sampling points and each access point.

Further, the first receiving unit 602 is specifically configured to receive a first response message to the request instruction from each access point, and record a first response message arrival time T2; and the second sending unit 603 is specifically configured to send, after the first response message is received, a first measurement report message to an access point that sends the first response message, and record a first measurement report message sending time T3, where the first measurement report message carries a difference between the first measurement report message sending time T3 and the first response message arrival time T2, namely, T3−T2, so that the access point that sends the first response message obtains a radio signal flight time between the access point and the client, namely, TOF=[(T4−T1)−(T3−T2)]/2, where T1 is a first response message sending time, and T4 is time when the first measurement report message arrives at the access point that sends the first response message.

Figure 7:
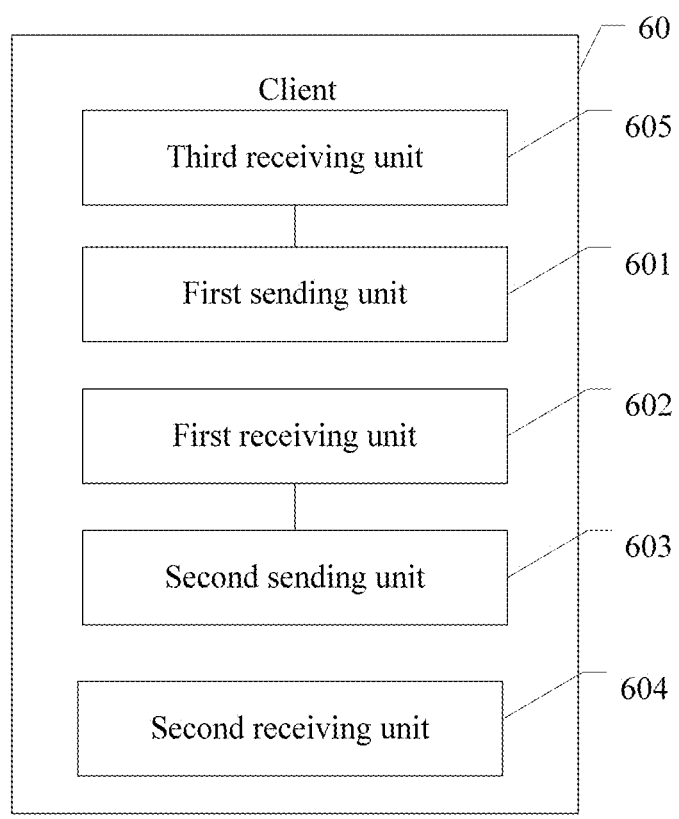
FIG. 7 is a second schematic structural diagram of the client according to Embodiment 5 of the present invention.

As shown in FIG. 7, the client 60 further includes: a third receiving unit 605 configured to receive, before the position request instruction is sent to the at least three access points, a beacon frame from each access point, where the beacon frame carries an ID and channel information of each of the at least three access points.

The client provided in this embodiment of the present invention can send a position request instruction to at least three access points, and each access point sends to the client a response message to the request instruction, and receives a corresponding measurement report message from the client, so as to obtain a radio signal flight time between itself and the client, and then send the radio signal flight time to a network side; then, the network side can perform a comparative calculation on the received radio signal flight times and a sampling time measured in advance between each access point and each of multiple sampling points, obtain a coordinate location of a sampling point whose corresponding sampling time has a minimum time difference from the radio signal flight time received from each access point, and inform the client about the coordinate location, where the coordinate location is a position of the client. By using this solution, accurate positioning can be implemented, enabling the client to learn its position accurately and further enhancing user convenience.

Figure 8:
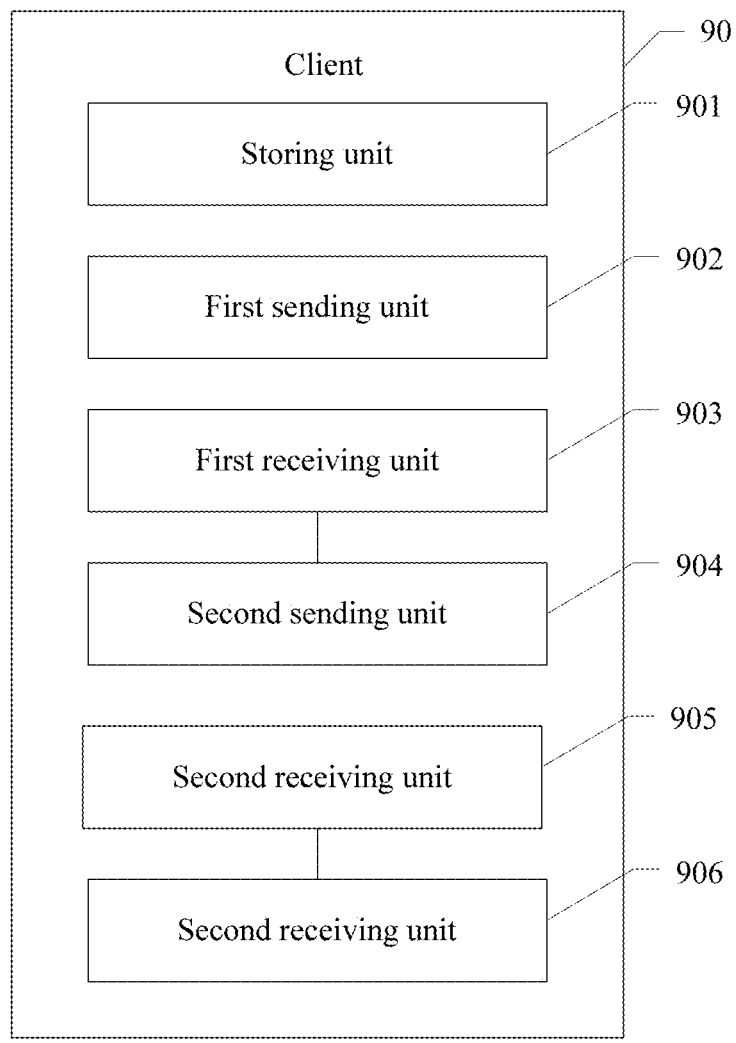
FIG. 8 is a third schematic structural diagram of the client according to Embodiment of the present invention.

An embodiment of the present invention further provides a client 90, which can be applied to the method provided in Embodiment 3. As shown in FIG. 8, the client includes: a storing unit 901 configured to store a radio signal flight time measured in advance between each of several sampling points and each access point; a first sending unit 902 configured to send a position request instruction to at least three access points, so that each access point sends a first measurement message to the client; a first receiving unit 903 configured to receive the first measurement message from each of the at least three access points; a second sending unit 904 configured to send, to each access point, a response message to the first measurement message; a second receiving unit 905 configured to receive a second measurement message from each access point, so as to obtain a radio signal flight time between each access point and the client; and a processing unit 906 configured to obtain a position estimation result, where the client performs a comparative calculation on the radio signal flight time between each access point and the client and a radio signal flight time measured in advance between each of the multiple sampling points and each access point, and uses a coordinate location of a sampling point with a minimum time difference as positioning coordinates of the client.

Further, the second sending unit 904 is specifically configured to record a first response message sending time T1 when sending to each access point a first response message to the first measurement message; the second receiving unit 905 is specifically configured to send, after receiving the first response message from each access point, the second measurement message, and record a second measurement message arrival time T4, where the second measurement message carries a second measurement message sending time T3 and time when the first response message arrives at each access point, namely, T2, or a difference between T3 and T2, namely, T3−T2; and the processing unit 906 is specifically configured to calculate the radio flight time between each access point and the client, namely, TOF=[(T4−T1)−(T3−T2)]/2.

The client provided in this embodiment of the present invention can send a position request instruction to at least three access points, and after receiving a first measurement message from each access point, send to each access point a response message to the first measurement message, and receive a second measurement message from each access point, so as to obtain a radio signal flight time between each access point and the client; and then, the client performs a comparative calculation on the obtained radio signal flight times and a radio signal flight time measured in advance between each of several sampling points and each access point, and uses a coordinate location of a sampling point with a minimum time difference as positioning coordinates of the client. By using this solution, accurate positioning can be implemented, enabling the client to learn its position accurately and further enhancing user convenience.

Embodiment 6

Figure 9:
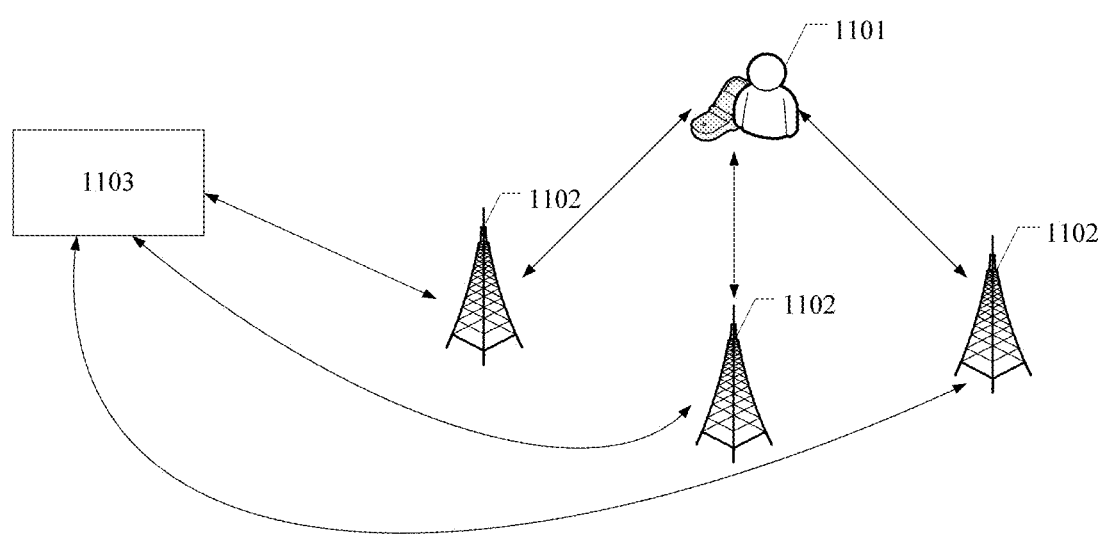
FIG. 9 is a first schematic structural diagram of a positioning system according to Embodiment 6 of the present invention.

The embodiment of the present invention provides an indoor positioning system. As shown in FIG. 9, the system includes a client 1101, at least three access points 1102, and a network side 1103.

The client 1101 is configured to receive, after sending a position request instruction to the at least three access points 1102, a response message sent by each access point 1102 in response to the request instruction, send a corresponding measurement report message to each access point 1102, so that each access point 1102 obtains a radio signal flight time between the access point 1102 and the client 1101, and receive a position estimation result from the network side 1103.

The at least three access points 1102 are configured to send, after receiving the position request instruction from the client 1101, sending the response message to the client 1101, and receiving the corresponding measurement report message from the client 1101, so as to obtain the radio signal flight time between each access point 1102 and the client 1101, and send the obtained respective radio signal flight time between each access point 1102 and the client 1101 to the network side 1103.

The network side 1103 is configured to perform a comparative calculation on the radio signal flight time received from each access point 1102 and a sampling time measured in advance between each of multiple sampling points and each access point 1102, obtain a coordinate location of a sampling point whose corresponding sampling time has a minimum time difference from the radio signal flight time received from each access point 1102, and send the coordinate location to the client 1101, where the sampling time for each of the multiple sampling points includes a radio signal flight time between each of the multiple sampling points and each access point.

In addition, the network side 1103 is further configured to store coordinate values of the multiple sampling points and the at least three access points 1102 deployed in a positioning service area, as well as the radio signal flight time between each access point 1102 and each sampling terminal.

In the positioning system provided in this embodiment of the present invention, each access point receives a position request instruction from a client, sends to the client a response message to the position request, and receives a corresponding measurement report message from the client, so as to obtain a radio signal flight time between itself and the client, and send the radio signal flight time between each access point and the client to a network side; the network side performs a comparative calculation on the radio signal flight time between each access point and the client and a radio signal flight time measured in advance between each of several sampling points and each access point, obtains a coordinate location of a sampling point with a minimum time difference, uses the coordinate location as a position estimation result, and informs the client about the position estimation result; and consequently, the client learns its position, which further enhances user convenience.

Figure 10:
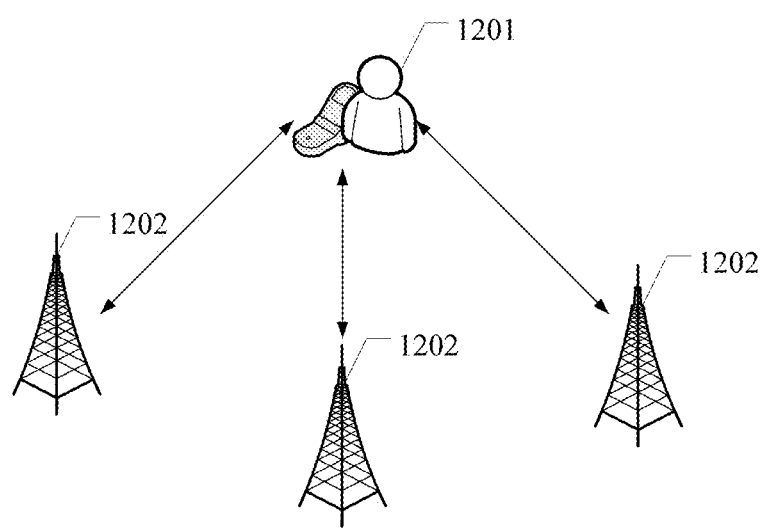
FIG. 10 is a second schematic structural diagram of the positioning system according to Embodiment 6 of the present invention.

An embodiment of the present invention provides another indoor positioning system. As shown in FIG. 10, the system includes a client 1201 and at least three access points 1202.

The client 1201 is configured to send a position request instruction to at least three access points 1202, receive a first measurement message from each access point 1202, send to each access point 1202 a response message to the first measurement message, receive a second measurement message from each access point 1202, so as to obtain a radio signal flight time between each access point 1202 and the client 1201, and perform a comparative calculation on the radio signal flight time between each access point and the client and a radio signal flight time measured in advance between each of several sampling points and each access point 1202, and use a coordinate location of a sampling point corresponding to a sampling time with a minimum time difference as positioning coordinates of the client.

The at least three access points 1202 are configured to receive the position request instruction from the client 1201, send the first measurement message to the client 1201, receive from the client 1201 the response message to the first measurement message, and send the second measurement message to the client 1201, so that the client 1201 obtains the radio signal flight time between each access point 1202 and the client 1201.

In the positioning system provided by the embodiment of the present invention, a client sends a position request instruction to at least three access points, receives a first measurement message from each access point, sends to each access point a response message to the first measurement message, and receives a second measurement message from each access point, so as to obtain a radio signal flight time between each access point and the client; the client performs a comparative calculation on the radio signal flight times and a radio signal flight time measured in advance between each of several sampling points and each access point, and uses a coordinate location of a sampling point with a minimum time difference as positioning coordinates of the client; consequently, the client learns its position, which further enhances user convenience.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning method, comprising:
    sending, by a client, a position request instruction to at least three access points;

receiving, by the client, a response message sent by each of the at least three access points in response to the request instruction;

sending, by the client, a corresponding measurement report message to each of the at least three access points, such that each of the at least three access points obtains and sends a radio signal flight time between itself and the client according to the corresponding measurement report message to a network side; and receiving, by the client, a position estimation result from the network side, wherein the network side performs a comparative calculation on the radio signal flight time received from each of the at least three access points and a sampling time stored in a reference point database and measured in advance between each access point and each of multiple sampling points at sampling points located in area that includes each access point arranged in a non-collinear manner, and the position estimation result is an obtained coordinate location of a sampling point included in one of the sampling points whose corresponding sampling time that was stored in the reference point database has a minimum time difference between the radio signal flight time of each of the at least three access points and the stored sampling time of each of the multiple sampling points, and wherein the sampling time for each of the multiple sampling points includes a radio signal flight time between each of the multiple sampling points and each access point.

2. The positioning method according to claim 1, wherein before sending, by the client, the position request instruction to the at least three access points, the method further comprises:

storing coordinate values of the multiple sampling points on the network side;

receiving, by a sampling terminal located at the sampling points, a response message from each of the at least three access points, and sending a corresponding measurement report message to each access point such that each of the at least three access points obtains a radio signal flight time between itself and each sampling terminal; and storing, by the network side, the radio signal flight time between each access point and each sampling terminal.

3. The positioning method according to claim 1, wherein receiving, by the client, the response message sent by each of the at least three access points in response to the request instruction, and sending, by the client, the corresponding measurement report message to each of the at least three access points such that each of the at least three access points obtains and sends the radio signal flight time between itself and the client, comprises:

receiving, by the client, a first response message sent by a first access point, and recording a first response message arrival time T2;

sending, by the client, a first measurement report message to the first access point, and recording a measurement report message sending time T3, wherein the first measurement report message carries the first measurement report message sending time T3 and the first response message arrival time T2, or a difference between T3 and T2, namely, T3−T2; and obtaining, by the first access point, a radio signal flight time between the first access point and the client, namely, TOF=[(T4−T1)−(T3−T2)]/2, wherein T1 is a first response message sending time, and T4 is time when the first measurement report message arrives at the first access point.

4. The positioning method according to claim 1, wherein before sending, by the client, the position request instruction to the at least three access points, the method further comprises:

receiving, by the client, a beacon frame from each of the at least three access points, wherein the beacon frame carries an identifier (ID) and channel information of each of the at least three access points, and wherein sending, by the client, the position request instruction to the at least three access points comprises sending, by the client according to the ID and channel information of each of the at least three access points, the position request instruction to the at least three access points.

5. The positioning method according to claim 1, wherein the response message is an acknowledgement control frame for the position request instruction.

6. A client, comprising:
a non-transitory computer readable medium having instructions stored thereon; and
a computer processor coupled to the non-transitory computer readable medium and configured to execute the instructions to:
send a position request instruction to at least three access points;
receive a response message sent by each of the at least three access points in response to the request instruction;
send a corresponding measurement report message to each access point such that each of the at least three access points obtains and sends a radio signal flight time between itself and the client according to the corresponding measurement report message to a network side; and
receive a position estimation result from a network side, where the network side performs a comparative calculation on the radio signal flight time received from each of the at least three access points and a sampling time stored in a reference point database and measured in advance between each of the at least three access points and each of multiple sampling points at sampling points located in an area that includes each access point arranged in a non-collinear manner, and the position estimation result is an obtained coordinate location of a sampling point included in one of the sampling points whose corresponding sampling time that was stored in the reference point database has a minimum time difference between the radio signal flight time of each of the at least three access points and the stored sampling time of each of the multiple sampling points, and wherein the sampling time for each of the multiple sampling points includes a radio signal flight time between each of the multiple sampling points and each of the at least three access points.

7. The client according to claim 6, wherein the computer processor is further configured to execute the instructions to:
receive, from each of the at least three access points, a first response message to the request instruction, and record a first response message arrival time T2; and
send, after the first response message is received, a first measurement report message to an access point that sends the first response message, and record a first measurement report message sending time T3, wherein the first measurement report message carries a difference between the first measurement report message sending time T3 and the first response message arrival time T2, namely, T3−T2, such that the access point that sends the first response message obtains a radio signal flight time between the access point and the client, namely, TOF=[(T4−T1)−(T3−T2)]/2, wherein T1 is a first response message sending time, and wherein T4 is time when the first measurement report message arrives at the access point that sends the first response message.

8. The client according to claim 6, wherein the computer processor is further configured to execute the instructions to:

receive, before the position request instruction is sent to the at least three access points, a beacon frame from each access point, wherein the beacon frame carries an identifier (ID) and channel information of each of the at least three access points; and send the position request instruction to the at least three access points according to the ID and channel information of each of the at least three access points.

9. A positioning system, comprising:

a client configured to receive, after sending a position request instruction to at least three access points, a response message sent by each access point in response to the request instruction, send a corresponding measurement report message to each access point such that each access point obtains and sends a radio signal flight time between itself and the client, and receive a position estimation result from a network side;

the at least three access points configured to send, after receiving the position request instruction from the client, the response message to the client, and receive the corresponding measurement report message from the client to respectively obtain the radio signal flight time between each access point and the client, and send the obtained respective radio signal flight time between each access point and the client to the network side; and the network side configured to perform a comparative calculation on the radio signal flight time received from each access point and a sampling time stored in a reference point database and measured in advance between each access point and each of multiple sampling points at sampling points located in an area that includes each access point arranged in a non-collinear manner, obtain a coordinate location of a sampling point included in the one of the sampling points whose corresponding sampling time has a minimum time difference between the radio signal flight time of each of the at least three access points and the stored sampling time of each of the multiple sampling points, and send the coordinate location to the client, wherein the sampling time for each of the multiple sampling points includes a radio signal flight time between each of the multiple sampling points and each access point.

10. The positioning system according to claim 9, wherein the network side is further configured to store coordinate values of the multiple sample points and the radio signal flight time between each access point and each sampling terminal.

* * * * *